United States Patent [19]

Ichiryu et al.

[11] Patent Number: 4,919,390

[45] Date of Patent: Apr. 24, 1990

[54] SOLENOID OPERATED VALVE APPARATUS

[75] Inventors: Ken Ichiryu, Ibaragi; Takashi Kanai, Kashiwa; Masami Ochiai, Atsugi; Nobuhiko Ichiki, Kashiwa, all of Japan

[73] Assignee: Hitachi Construction Machinery Co., Ltd., Tokyo, Japan

[21] Appl. No.: 288,096

[22] Filed: Dec. 22, 1988

[30] Foreign Application Priority Data

Dec. 29, 1987 [JP] Japan ............................... 62-201503

[51] Int. Cl.$^{5}$ ............................................. F16K 31/06

[52] U.S. Cl. ............................... 251/129.15; 335/262; 335/297

[58] Field of Search ................... 251/129.15; 335/262, 335/297, 236

[56] References Cited

U.S. PATENT DOCUMENTS 4,067,541 1/1978 Hunter .......................... 251/129.15
4,453,700 6/1984 Otsuki et al. .
4,643,359 2/1987 Casey ........................ 251/129.15 X
4,662,605 5/1987 Garcia .

FOREIGN PATENT DOCUMENTS 1296260 5/1969 Fed. Rep. of Germany ....................... 251/129.15
DE. 1550112 5/1969 Fed. Rep. of Germany .
4722516 10/1972 Japan .

*Primary Examiner*—Arnold Rosenthal
*Attorney, Agent, or Firm*—Fay, Sharpe, Beall, Fagan, Minnich & McKee

[57] ABSTRACT

A solenoid operated valve apparatus in which a solenoid device includes an inner yoke, a plunger guide disposed in the opposed relationship with the inner yoke, a plunger movably accommodated in s space formed between the inner yoke and the plunger guide, a bobbin frame disposed to surround the inner yoke and said plunger guide, a coil wound around the bobbin frame, and an outer yoke disposed to surround the coil. The bobbin frame is made of a polymeric material, and is adhered to the inner yoke and the plunger guide in a unitary structure.

4 Claims, 3 Drawing Sheets

SOLENOID OPERATED VALVE APPARATUS

BACKGROUND OF THE INVENTION

1. Field of the Invention:

The present invention relates to a solenoid operated valve apparatus, and, more particularly, to a solenoid device of a solenoid operated valve apparatus used for controlling the flow rate of a hydraulic fluid.

2. Description of the Related Art:

Conventional solenoid devices of solenoid operated valve apparatus are disclosed in, for example, JP-A-47-22516. The solenoid device of this type includes an inner yoke, a plunger guide disposed in opposed relationship with the inner yoke, and a plunger movably provided in a space or a plunger chamber formed between the inner yoke and the plunger guide. A lid body is fitted in the inner yoke. First and second rods of the plunger are movably supported by a bearing fitted in the plunger guide and a bearing fitted in the lid body, respectively. The solenoid device also includes a non-magnetic ring fitted on the plunger guide and inner yoke through O-rings to surround portions of the plunger guide and the inner yoke, a bobbin frame fitted on the non-magnetic ring to surround the same, a coil wound around the bobbin frame, and an outer yoke fitted on the bobbin frame to surround the coil. The plunger guide is provided with a communication hole through which hydraulic fluid flows into and out of the plunger chamber.

In the thus-arranged solenoid device, the plunger moves by virtue of a magnetic field formed when the coil is excited, thereby moving a spool of a solenoid operated valve body (not shown) which is in contact with the first rod. In consequence, the opening of a variable restricting portion associated with the spool, for example, is controlled to accomplish a predetermined valve function, e.g., flow rate control or pressure control.

The precision with which the above-described solenoid device operates depends on the precision with which it is assembled. This means that the precision of the device in operation depends on the accuracy of the centering between the plunger guide and the lid body which supports the plunger. Since the lid body is fitted in the inner yoke, the precision of the device further relies on the accuracy of the centering between the plunger guide and the inner yoke. However, in the conventional solenoid device, since the non-magnetic ring is mounted to surround the plunger guide and the inner yoke and the bobbin frame is in turn mounted to surround this non-magnetic ring, the number of man-hours required for machining and assembling the parts must be high for achieving a desired centering accuracy, thereby increasing the overall production cost.

More specifically, the accuracy of the centering between the plunger guide and the inner yoke relies on the machining precision when these parts are made. Further, the non-magnetic ring is thin and therefore cannot be made strong enough to withstand the force of a bobbin frame bearing against it if the latter is misplaced from the center position. Thus any misalignment of the bobbin frame affects the plunger guide and the inner yoke. This means that the accuracy with which the centering is performed also depends on the machining precision of the non-magnetic ring and the bobbin frame. Thus, in order to improve the centering accuracy, these four parts must be machined with a high degree of precision and be assembled with the greatest possible care.

Further, in the conventional solenoid device of the above-described type, since the inner yoke, the plunger guide and the non-magnetic ring are provided as separate members, O-rings must be provided so as to prevent oil leakage from the gap between these members, thereby increasing the number of parts required and, hence, the production cost.

SUMMARY OF THE INVENTION

Accordingly, an object of the present invention is to provide a solenoid operated valve apparatus in which the solenoid device can be assembled with a high degree of accuracy and manufactured at a low cost.

The above-described object of the present invention can be achieved by the provision of a solenoid operated valve apparatus in which a solenoid device includes an inner yoke, a plunger guide disposed in opposed relationship with the inner yoke, a plunger movably accommodated in a space formed between the inner yoke and the plunger guide, a bobbin frame disposed to surround the inner yoke and the plunger guide, a coil wound around the bobbin frame, and an outer yoke disposed to surround the coil, wherein the bobbin frame is made of a polymeric material and is adhered to the inner yoke and the plunger guide in a unitary structure.

Preferably, a reinforcing non-magnetic ring may be disposed between the opposed end portions of the inner yoke and the plunger guide, the non-magnetic ring being adhered to the polymeric material which forms the bobbin frame.

Further, a pressure chamber which communicates with the space in which the plunger is accommodated may be formed in an end portion of the inner yoke remote from the plunger guide so that the inner yoke is urged toward the plunger guide by virtue of the pressure introduced into the pressure chamber when fluid pressure acts in the space.

Furthermore, the plunger guide may have a communication hole which includes a first passageway communicating with the space in which the plunger is accommodated and a second passageway communicating with a space through which a plunger rod of the plunger is passed, the second passageway intersecting the first passageway. In a portion where the first and second passageways intersect, a recessed portion having a bottom surface which lies across the second passageway is provided. The recessed portion is opened at the outer peripheral surface of the plunger guide. A filter is accommodated in the recessed portion and is sealed with the polymeric material of the bobbin frame.

In the present invention arranged in the manner described above, the bobbin frame can be formed by disposing the plunger guide and the inner yoke in opposed relationship with each other and then by injection molding a polymeric material from the outside of the plunger guide and the inner yoke with a core placed in a hollow portion formed in the two members. At this time, the material of the bobbin frame is adhered to the plunger guide and the inner yoke concurrently with the injection molding of the bobbin frame. Also, centering of the plunger guide and the inner yoke is automatically achieved at this time by the presence of the core. In consequence, the accuracy of the centering between the plunger guide and the inner yoke can be ensured, and only the machining precision of the plunger guide and the inner yoke needs to b considered. Further, the bobbin frame, the plunger guide and the inner yoke are adhered to each other in a unitary structure concurrently with the molding of the bobbin frame, resulting in a reduction in the number of man-hours required for machining and assembling parts. Further, since the bobbin frame is adhered to the plunger guide and the inner yoke, the bobbin frame itself provides sealing against fluid inner pressure. This eliminates the need to provide O-rings, reducing the number of parts required and, hence, the number of man-hours required for machining and assembling parts. It is thus possible to reduce the number of man-hours required for machining and assembling parts while at the same time ensuring the necessary accuracy of the centering. This enables the solenoid device assembled with a high degree of accuracy to be manufactured at a low production cost.

When the reinforcing non-magnetic ring is disposed between the opposed end portions of the inner yoke and the plunger guide, the portion located between these opposed end portions can be made sufficiently strong.

In the case where the pressure chamber is formed in the end portion of the inner yoke remote from the plunger guide so that the inner yoke is urged toward the plunger guide by virtue of the internal pressure which acts therein, a compressive stress rather than a tensile stress acts in the axial direction on a protruding portion of a polymeric material which is formed between the opposed end portions of the inner yoke and the plunger guide as part of the bobbin frame. This allows the strength of the portion having relatively low strength to be increased and this increases its life.

Furthermore, when the filter accommodated in the filter accommodating recessed portion is sealed with the polymeric material of the bobbin frame, the filter can be held in the recessed portion concurrently with the molding of the bobbin material, thus facilitating the setting of the filter.

DETAILED DESCRIPTION OF THE PREFERRED EMBODIMENTS

A first embodiment of the present invention will be described below with reference to FIG. 1.

Figure 1:
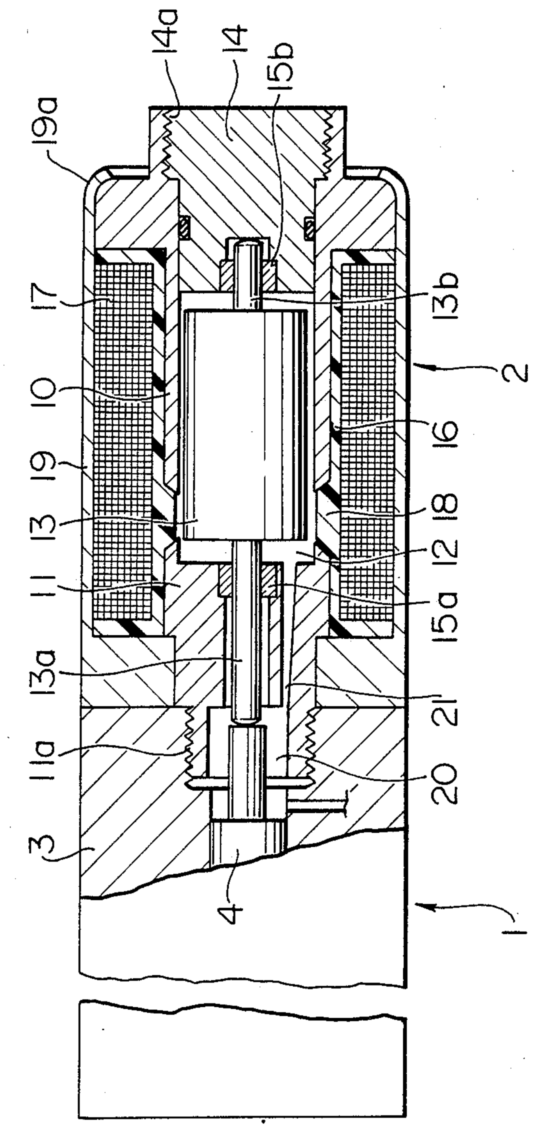
FIG. 1 is a cross-sectional view of parts of a solenoid operated valve apparatus, showing a first embodiment of the present invention.

A solenoid operated valve apparatus shown in FIG. 1 includes a valve body 1, and a solenoid device 2 coupled to the valve body 1 for operating the valve body 1. The valve body 1 has a casing 3, and a spool 4 which moves within the housing 3 in the axial direction. The opening of a variable restricting portion (not shown) associated with the spool, for example, is controlled by the movement of this spool 4 so as to accomplish a predetermined valve function, e.g., a flow rate control or pressure control.

The solenoid device 2 has an inner yoke 10, a plunger guide 11 disposed in opposed relationship with the inner yoke, and a plunger 13 movably disposed in a space or a plunger chamber 12 formed between the inner yoke 10 and the plunger guide 11. A lid body 14 having a threaded portion **14*a* is fitted into the end portion of the inner yoke 10 remote from the plunger guide 11. The plunger 13 has a first rod 13*a* which is located on the left side thereof as viewed in FIG. 1, and a second rod 13*b* located on the right side as viewed in FIG. 1. The first and second rods 13*a* and 13*b* are movably supported by a bearing 15*a* fitted in the plunger guide 11 and a bearing 15*b* fitted in the lid body 14**, respectively.

A bobbin frame 16 around which a coil 17 is wound is disposed to surround portions of the plunger guide 11 and the inner yoke 10. The bobbin frame 16 is made of a polymeric material having a relatively high strength such as polyphenyl sulfide (PPS) or polybutyl terephthal (PBT). The material of the bobbin frame 16 is adhered to the inner yoke 10 and the plunger guide 11 in a unitary structure. The bobbin frame 16 has a protruding portion 18 which is located between the opposed end portions of the inner yoke 10 and the plunger guide 11.

An outer yoke 19 is mounted to surround the plunger guide 11, the bobbin frame 16, the coil 17 and the inner yoke 10. The outer yoke 19 is fixed to the inner yoke 10 by caulking one end **19*a*** thereof.

The plunger guide 11 is provided with a communication hole 21 which communicates the plunger chamber 12 with an opening 20 through which the forward end of the first plunger rod **13*a* is passed. The end portion of the plunger guide 11 in which the opening 20 is formed has a threaded portion 11*a*, by means of which the solenoid device 2 is coupled to the housing 3 of the valve body 1**.

In the thus-arranged solenoid device 2, the plunger 13 moves by virtue of a magnetic field formed when the coil 17 is excited, thereby moving the spool 4 of the valve body 1 which is in contact with the first plunger rod **13*a*, as in the case of the conventional solenoid device. In consequence, the valve body 1 accomplishes the above-mentioned predetermined valve function. A suitable amount of hydraulic fluid in the valve body 1 is introduced into the plunger chamber 12 through the communication hole 21** as a balancing pressurized fluid.

The solenoid device 2 of the above-described type is manufactured in the manner described below. After the bearings **15*a* and 15*b*, the inner yoke 10, and the plunger guide 11 have been separately machined, the bearing 15*a* is fitted into the plunger guide 11, the plunger guide 11 with the bearing 15*a* fitted therein and the inner yoke 10 are disposed in opposed relationship with each other, and injection molding of a polymeric material is then performed from the outside of the plunger guide 11 and the inner yoke 10 with a core being inserted in a hollow portion formed by the inner yoke 10 and the plunger guide 11. That is, an insert molding using a core is performed. In consequence, the bobbin frame 16 having the protruding portion 18 is formed. At the same time, the material of the bobbin frame 16 formed is adhered to the inner yoke 10 and the plunger guide 11 concurrently with the formation thereof, and the inner yoke 10, the plunger guide 11 and the bobbin frame 16** are thereby connected to each other firmly as a unit.

Subsequently, the coil 17 is wound around the bobbin frame 16, the outer yoke 19 is covered over the coil, and the end portion 19a of the outer yoke 19 is caulked so that the outer yoke 19 and the inner yoke 10 are made integral with each other.

Next, the plunger 13 having the first and second rods 13a and 13b are inserted into the plunger chamber 12, and the first rod 13a is supported by the bearing 15a. Thereafter, the lid body 14 with the bearing 15b inserted therein is inserted into the inner yoke 10 so that the second rod 13b is supported by the bearing 15b. Next, the lid body 14 is rotated so as to allow the threaded portion 14a thereof to be threadingly engaged with the inner 10.

In the embodiment shown in FIG. 1, the bobbin frame 16 is adhered to the plunger guide 11 and the inner yoke 10 in a unitary structure concurrently with the injection molding of the bobbin frame 16. Also, centering of the plunger guide 11 and the inner yoke 10 is automatically achieved at this time by the presence of the core. In consequence, the accuracy of the centering between the plunger guide 11 and the inner yoke 10 is ensured, and only the machining precision of the plunger guide 11 and the inner yoke 10 needs to be considered. Further, the bobbin frame 16, the plunger guide 11 and the inner yoke 10 are adhered to each other concurrently with the molding of the bobbin frame 16, resulting in a reduction in the number of man-hours required for machining and assembling parts. Further, since the bobbin frame 16 is adhered to the plunger guide 11 and the inner yoke 10, the bobbin frame itself provides sealing for the plunger chamber 12 with which it withstands inner fluid pressure. This eliminates the need to provide O-rings, reducing the number of parts required and, hence, the number of man-hours required for machining and assembling parts. In this embodiment, it is thus possible to reduce the number of man-hours required for machining and assembling parts while at the same time ensuring the necessary accuracy of the centering. This enables the solenoid device assembled with a high degree of accuracy to be manufactured at a low production cost.

Other embodiments of the present invention will be described below with reference to FIGS. 2 and 3. These embodiments differ from the first embodiment with the structure of the portion of the solenoid device which is located between the opposed end portions of an inner yoke and a plunger guide.

Figure 2:
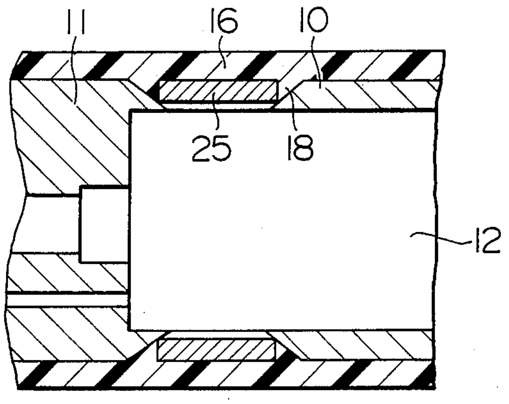
FIG. 2 is a cross-sectional view of the essential parts of a solenoid operated valve apparatus, showing a second embodiment of the present invention.

More specifically, in the embodiment shown in FIG. 2, a non-magnetic ring 25 made of stainless steel, for example, is disposed between the opposed end portions of the inner yoke 10 and the plunger guide 11. The bobbin frame 16 having the protruding portion 18 is injection formed in the state where the non-magnetic ring 25 has been disposed. In the embodiment shown in FIG. 3, a non-magnetic ring 26 which is long enough to be supported by the outer peripheral surfaces of the inner yoke 10 and plunger guide 11 is disposed between the opposed end portions. The bobbin frame 16 is also injection formed in that state.

Figure 3:
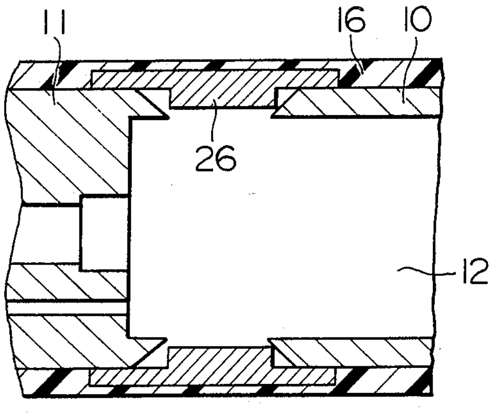
FIG. 3 is a cross-sectional view of the essential parts of a solenoid operated valve apparatus, showing a third embodiment of the present invention.

In the embodiments shown in FIGS. 2 and 3, provision of the non-magnetic ring 25 or 26 between the opposed end portions of the inner yoke 10 and plunger guide 11 ensures, in addition to the advantages of the embodiment shown in FIG. 1, that the portion of the operating device where no metal portions of the inner yoke 10 and plunger guide 11 are located has sufficient strength.

Figure 5:
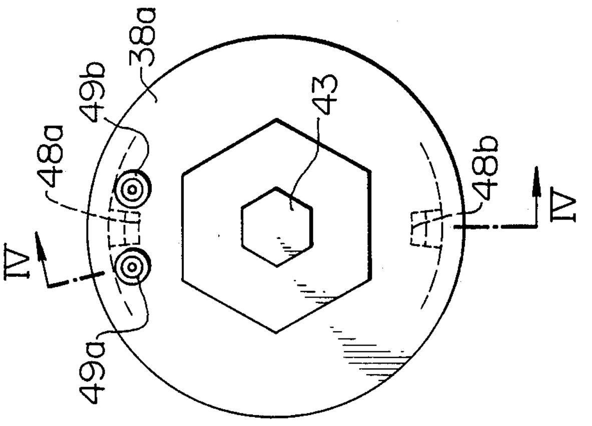
FIG. 5 is an end view of the solenoid device shown in FIG. 4.
Figure 4:
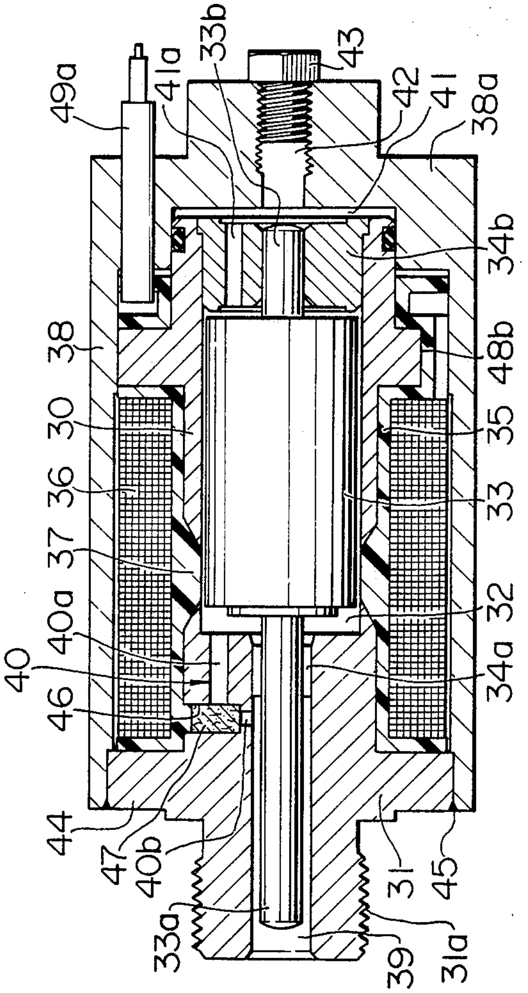
FIG. 4 is a cross-sectional view of a solenoid device of a solenoid operated valve apparatus, showing a fourth embodiment of the present invention.

Still another embodiment of the present invention will be described below with reference to FIGS. 4 and 5.

A solenoid device 2 of this embodiment includes an inner yoke 30, a plunger guide 31, a plunger chamber 32, a plunger 33, first and second rods 33a and 33b of the plunger 33, bearings 34a and 34b, a bobbin frame 35, a coil 36, a protruding portion 37 of the bobbin frame 35, an outer yoke 38, an opening 39, a communication hole 40, and a threaded portion 31a, the bobbin frame 35 being made of a polymeric material and being adhered to the inner yoke 30 and the plunger guide 31, just like that of the first embodiment shown in FIG. 1. However, this embodiment differs from the first embodiment as follows:

Unlike the first embodiment shown in FIG. 1, the end portion of the inner yoke 30 remote from the plunger guide does not receive the lid body 6, but the bearing 34b supporting the second rod 33b of the plunger 33 is formed as a metal bearing, and the end portion of the inner yoke 30 directly receives this bearing 34b. Further, the outer yoke 38 is fitted from the side of the solenoid device where the end portion of the inner yoke and the bearing 34b are located, and has an end wall 38a at this side of the solenoid device. A pressure chamber 41 is formed between the bearing 34b and the end wall 38a. The bearing 34b is provided with a communicating hole 41a which communicates the plunger chamber 32 with the pressure chamber 41, and the end wall 38a is provided with an air venting hole 42, which is normally closed by a plug 43. On the side of the solenoid device remote from the end wall 38a, the diameter of the central portion of the plunger guide 31 is enlarged to provide an end wall 44. The end portion of the outer yoke 38 on the corresponding side is extended to cover this end wall 44, and the extended end portion of the outer yoke and the end wall 44 are welded ad 45 to each other by plasma arc welding or the like.

The communication hole 40 formed in the plunger guide 31 consists of a first passageway 40a which runs in the axial direction and communicates with the plunger chamber 32, and a second passageway 40b which communicates with the opening 39 and runs in the radial direction to intersect the first passageway 40a. In the portion where the first and second passageways 40a and 40b intersect each other, a radial recessed portion 46 having a bottom surface which lies across the second passageway 40b is provided, and the recessed portion 46 is opened at the outer peripheral surface of the plunger guide 31. A filter 47 is accommodated in the recessed portion and is sealed with the polymeric material of the bobbin frame 35.

The inner yoke 30 has a flange 48 at the central portion. The flange 48 has notches 48a and 48b formed at the opposed positions along the diameter, as partially shown by the broke lines in FIG. 5, and the leads of the coil 36 are passed through the notches. These leads are connected to terminals 49a and 49b mounted on the outer yoke 38 so that current is supplied to the coil from an external circuit. The bobbin frame 35 made of a polymeric material is extended past the notches 48a and 48b to the terminals 49a and 49b.

In the thus-arranged solenoid device, when a hydraulic fluid is introduced into the plunger chamber 32 to generate an internal pressure, the same amount of pressure is introduced in the pressure chamber 40. This generates a force that urges the inner yoke 30 toward the plunger guide 31 due to the relationship between the area of the pressure receiving surface of the plunger chamber 32 and that of the pressure chamber 40. In consequence, a compressive stress rather than a tensile stress acts in the protruding portion 37 which is part of the bobbin frame 35 located between the opposed end portions of the inner yoke 30 and the plunger guide 31. Because the material generally withstands the compressive stress more than it withstands the tensile stress, the strength of the protruding portion 37 with which it withstands the fluid pressure can be improved and the life thereof can be prolonged despite the fact that the protruding portion 37 is made of a polymeric material having a relatively low strength.

The filter 47 which is capable of removing impurities that pass through the communication passage 40 together with the fluid is set in the recessed portion 46 concurrently with the formation of the bobbin frame 35. As a result, the provision of a special means for fixing the filter can be eliminated, and the provision of the filter can be facilitated.

Further, since the outer yoke 38 is inserted from the side of the end portion of the inner yoke 30 remote from the plunger guide and the inserted end portion of the outer yoke 38 is then attached to the plunger guide 31, no excess force is applied to the inner yoke 30 during the assembly, and the centering accuracy between the inner yoke 30 and the plunger guide 31 is further improved.

As will be understood from the foregoing description, according to the invention, since the bobbin frame is made of a polymeric material, and this bobbin frame is adhered to the inner yoke and the plunger guide to form a unitary structure, the number of man-hours required for assembling and machining the parts can be reduced, while the accuracy with which assembly is performed is ensured. This enables a solenoid operated valve apparatus having a higher quality than that of a conventional one to be manufactured at a low production cost.

What is claimed is:

1. A solenoid operated valve apparatus in which a solenoid device includes an inner yoke, a plunger guide disposed in opposed relationship with said inner yoke, a plunger movably accommodated in a space formed between said inner yoke and said plunger guide, a bobbin frame disposed to surround said inner yoke and said plunger guide, a coil wound around said bobbin frame, and an outer yoke disposed to surround said coil, wherein:

said bobbin frame is made of a polymeric material and is connected to said inner yoke and said plunger guide by adhering the bobbin frame with the inner yoke and plunger guide to form a unitary structure concurrently with a molding of the bobbin frame, said inner yoke and said plunger guide having inner surfaces which define said space in which said plunger is accommodated.

2. A solenoid operated valve apparatus according to claim 1, wherein a reinforcing non-magnetic ring is disposed between the opposed end portions of said inner yoke and said plunger guide, and said non-magnetic ring is adhered to said polymeric material of the bobbin frame in a unitary structure.

3. A solenoid operated valve apparatus according to claim 1, wherein a pressure chamber which communicates with said space in which said plunger is accommodated is formed in an end portion of said inner yoke remote from said plunger guide so that said inner yoke is urged toward said plunger guide by virtue of the pressure introduced into said pressure chamber when fluid pressure acts in said space.

4. A solenoid operated valve apparatus according to claim 1, wherein said plunger guide has a communication hole which includes a first passageway communicating with said space in which said plunger is accommodated and a second passageway communicating with a space through which a plunger rod of said plunger is passed, said second passageway intersecting said first passageway, a recessed portion having a bottom surface which lies across said second passageway in a portion where said first and second passageways intersect, said recessed portion being open at an outer peripheral surface of said plunger guide, and a filter being accommodated in said recessed portion that is sealed with the polymeric material of said bobbin frame.

* * * * *